(12) United States Patent
Grcic et al.

(10) Patent No.: US 10,539,262 B2
(45) Date of Patent: Jan. 21, 2020

(54) FLUID LINE

(71) Applicant: NORMA GERMANY GMBH, Maintal (DE)

(72) Inventors: Dragan Grcic, Kanjiza (RS); Stephan Mann, Biebergemuend (DE)

(73) Assignee: NORMA GERMANY GMBH, Maintal (DE)

( * ) Notice: Subject to any disclaimer, the term of this patent is extended or adjusted under 35 U.S.C. 154(b) by 0 days.

(21) Appl. No.: 15/319,639

(22) PCT Filed: Jun. 16, 2015

(86) PCT No.: PCT/EP2015/063464
§ 371 (c)(1),
(2) Date: Dec. 16, 2016

(87) PCT Pub. No.: WO2015/193304
PCT Pub. Date: Dec. 23, 2015

(65) Prior Publication Data
US 2017/0122478 A1    May 4, 2017

(30) Foreign Application Priority Data
Jun. 17, 2014   (DE) ......................... 10 2014 108 494

(51) Int. Cl.
*F16L 53/00* (2018.01)
*F16L 53/38* (2018.01)
(Continued)

(52) U.S. Cl.
CPC ............ *F16L 53/38* (2018.01); *F01N 3/2066* (2013.01); *F16L 55/02754* (2013.01); *F01N 2610/02* (2013.01); *F01N 2610/14* (2013.01)

(58) Field of Classification Search
CPC .... F16L 53/38; F16L 55/02754; F01N 3/2066
(Continued)

(56) References Cited

U.S. PATENT DOCUMENTS 2,408,253 A * 9/1946 Diebold ................... H02G 7/00
138/110
2,599,671 A * 6/1952 Thompson .............. F16L 53/38
73/714

(Continued)

FOREIGN PATENT DOCUMENTS

DE   10 2008 018 658    10/2009
EP       2 527 702      11/2012
(Continued)

OTHER PUBLICATIONS

Japan Office Action conducted in counterpart Japan Appln. No. 2016-570323 (dated Dec. 21, 2017) (w/ English language translation).
(Continued)

*Primary Examiner* — James F Hook
(74) *Attorney, Agent, or Firm* — Greenblum & Bernstein, P.L.C.

(57) ABSTRACT

The invention relates to a fluid line (1), comprising a pipe (2), which has an inlet-side end segment (3) having a first connector (5) and an outlet-side end segment (4) having a second connector (10), wherein a cavity (17) bounded in the radially inward direction by at least one auxiliary element (16) is formed in the pipe (2). The problem addressed by the invention is that of minimizing the requirements for the suction performance of a pump that is used to convey a liquid through the pipe. This problem is solved in that a volume reduction element (18) is arranged in the cavity (17) at least in the region of the outlet-side end segment (4).

9 Claims, 1 Drawing Sheet

(51) Int. Cl.
  *F01N 3/20* (2006.01)
  *F16L 55/027* (2006.01)
(58) Field of Classification Search
  USPC ................ 138/108, 110, 113, 40, 33, 26
  See application file for complete search history.

(56) References Cited

U.S. PATENT DOCUMENTS

| | | | | |
|---|---|---|---|---|
| 2,750,487 A * | 6/1956 | Hynes | ................ | H05B 3/42 |
| | | | | 138/33 |
| 2,793,917 A * | 5/1957 | Ward | ................ | E21B 17/105 |
| | | | | 138/108 |
| 3,349,619 A * | 10/1967 | Millar | ................ | G01F 1/40 |
| | | | | 138/40 |
| 3,407,837 A | 10/1968 | Fulton et al. | | |
| 3,924,661 A * | 12/1975 | Bornhoffer | ............ | B65D 85/16 |
| | | | | 138/110 |
| 4,883,943 A * | 11/1989 | Davis | ................ | F02M 31/125 |
| | | | | 392/486 |
| 5,018,260 A * | 5/1991 | Ziu | ................ | F16L 7/00 |
| | | | | 138/108 |
| 5,201,343 A * | 4/1993 | Zimmermann | ... | F16L 55/02763 |
| | | | | 138/109 |
| 5,749,398 A * | 5/1998 | Kambara | ................ | F16L 9/18 |
| | | | | 138/103 |
| 6,015,015 A * | 1/2000 | Luft | ................ | E21B 17/1007 |
| | | | | 166/241.6 |
| 6,143,988 A * | 11/2000 | Neuroth | ............ | E21B 17/1085 |
| | | | | 138/113 |
| 6,167,883 B1 * | 1/2001 | Beran | ................ | F16L 53/38 |
| | | | | 128/203.17 |
| 7,635,008 B2 * | 12/2009 | Follett | ................ | F24F 13/08 |
| | | | | 138/108 |
| 2009/0034949 A1 | 2/2009 | Sawada et al. | | |
| 2010/0064670 A1 | 3/2010 | Starke et al. | | |
| 2010/0144182 A1 * | 6/2010 | Dude | ................ | F16L 53/38 |
| | | | | 439/193 |
| 2010/0175469 A1 * | 7/2010 | Ni | ............ | F16L 53/38 |
| | | | | 73/204.27 |
| 2010/0186844 A1 * | 7/2010 | Koskey, Jr. | ........... | F16L 53/008 |
| | | | | 138/33 |
| 2010/0193530 A1 * | 8/2010 | Leonard | ............ | F01N 3/2066 |
| | | | | 220/694 |
| 2012/0121475 A1 * | 5/2012 | van Niekerk | ........... | F01N 3/027 |
| | | | | 422/169 |
| 2012/0291904 A1 | 11/2012 | Eckardt et al. | | |
| 2013/0022340 A1 * | 1/2013 | Schulz | ............ | G05D 23/2401 |
| | | | | 392/472 |
| 2013/0279892 A1 * | 10/2013 | Dude | ................ | F16L 53/38 |
| | | | | 392/479 |
| 2014/0029927 A1 * | 1/2014 | Leblanc | ............ | F16L 11/127 |
| | | | | 392/478 |
| 2015/0240693 A1 * | 8/2015 | Birman | ................ | F01N 3/2066 |
| | | | | 392/488 |
| 2017/0023164 A1 * | 1/2017 | Wildegger | ............ | H05B 3/48 |

FOREIGN PATENT DOCUMENTS

| | | |
|---|---|---|
| FR | 2 478 161 | 9/1981 |
| JP | 1975-073048 | 6/1975 |
| JP | 2009-30771 | 2/2009 |
| JP | 2012-241901 | 12/2012 |
| WO | 98/42924 | 10/1998 |
| WO | 2006/136306 | 12/2006 |

OTHER PUBLICATIONS

Korea Office Action conducted in counterpart Korea Appln. No. 10-2017-7001348 (dated Jul. 31, 2018) (w/ English language translation).

* cited by examiner

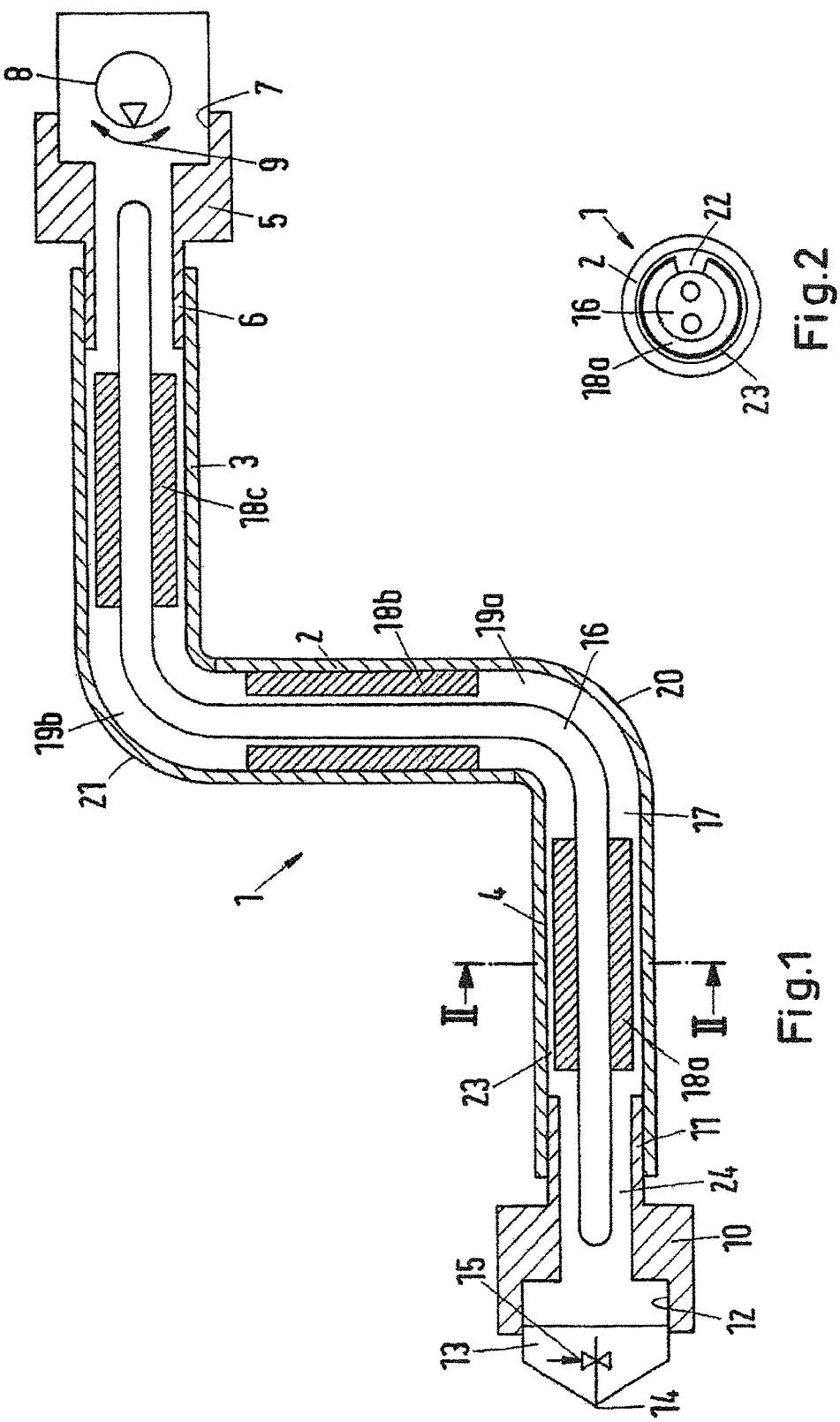

FLUID LINE

The invention relates to a fluid line with a pipe which has an inlet-side end portion with a first connector and an outlet-side end portion with a second connector, wherein a cavity delimited radially inwardly by at least one auxiliary element is formed in the pipe.

The invention is described below in connection with a fluid pipe which is used to transport a urea solution from a storage container to an injection device. Urea is injected into an exhaust tract of a diesel engine using an injection device in order to reduce nitrous oxides.

At low temperatures, urea freezes. When urea freezes, there is a danger that the quantity of urea remaining in the injection device will damage the injection device.

In order to avoid the risk of damage to the injection device by the freezing urea, after switching off the engine, the urea solution may be drawn back from the line so that at least the injection device is free from urea. For extraction, ideally the same pump is used which is also used for delivering urea from the storage container to the injection device. This pump is however primarily a delivery pump which delivers urea from the inlet-side end portion of the pipe to the outlet-side end portion, i.e. with a specific pressure. The suction power of such a pump is usually significantly poorer.

The invention is based on the object of keeping the requirements for the suction power of a pump to a low level.

This object is achieved according to the invention in that a volume reduction element is arranged in the cavity, at least in the region of the outlet-side end portion.

In a urea line, often a heating element is already arranged in the cavity and delimits the cavity radially inwardly. In simple terms, in this case the cavity is configured as an annular cavity. The heating element may however also be formed by several elements, or further elements may be arranged in the interior of the pipe so that the term "annular" is not correct in all cases. It is however used in the description below for the sake of simplicity. The auxiliary element indeed reduces the free volume in the interior of the pipe. Nonetheless, a volume which remains is relatively large and imposes an increased requirement on the suction power of the pump. If now, in addition to the auxiliary element, a volume reduction element is arranged in the cavity, the remaining volume of the cavity is reduced further. Thus the possible quantity of a fluid which may remain in the interior of the pipe and must be extracted is reduced. The smaller this quantity of fluid, the lower the requirement for the suction power of the pump. Surprisingly, in many cases it is sufficient to arrange the volume reduction element merely in the outlet-side end portion. If the pump then extracts the fluid from the interior of the pipe at the inlet-side end portion, due to the reduction in free volume in the region of the outlet-side end portion, a sufficient suction pressure is created to evacuate the injection device. In addition, this has the advantage that the regions of the pipe which contain the volume reduction element can be evacuated relatively quickly, so that only air remains in these regions which opposes the suction of the pump with a relatively low resistance. Thus as a whole, the injection device, and perhaps also the entire fluid line, can be evacuated more quickly.

Preferably, the volume reduction element extends beyond the outlet-side end portion in the direction of the inlet-side end portion. In principle, the entire pipe may be provided with a volume reduction element in order to keep the free volume inside the pipe small. Thus a larger flow resistance would result which opposes the through-flow of a fluid from the inlet-side end to the outlet-side end. When the fluid line is used to transport urea to a diesel engine, however, this is not critical since here there are no large quantities of urea to be transported quickly.

Preferably, the volume reduction element has a plurality of portions, wherein a gap is provided between at least two portions. If several portions are provided, assembly of the line is easier. The portions of the volume reduction element may be mounted individually, which constitutes a certain advantage in longer lines in particular.

It is preferred that the pipe has a curved portion and the gap is arranged in the curved portion. In many cases, the line is produced such that the auxiliary element and the volume reduction element are inserted in a pipe with straight extension. The pipe is then bent in order to produce the curved portion. It may be necessary to heat the pipe. In the region of the curved portion, if a gap is provided between two portions of the volume reduction element, the volume reduction element does not hinder the formation of the curvature. In particular, this prevents a blockage of the interior of the pipe in the region of the curved portion.

Preferably, the volume reduction element extends over the entire length of the pipe. In this way, the volume is kept small over the entire length of the pipe. Gaps between portions of the volume reduction element have practically no disruptive effect because they do not disproportionately enlarge the volume available for the fluid which must be evacuated.

Preferably, the volume reduction element has a recess extending along the length of the pipe. The volume reduction element indeed reduces the free flow cross-section for a fluid which flows from the inlet-side end to the outlet-side end. However, it increases the wetted surface area, so that an increased flow resistance results which could in turn impose higher requirements for the pump, in particular on extraction of the fluid. In this case, the recess provides a continuous flow channel which has a relatively small wetted surface area and hence also a relatively low flow resistance. The volume available for the fluid is not disproportionately enlarged by the recess.

Preferably, the volume reduction element lies against the radial inside and/or radial outside of the cavity. Thus a defined position of the volume reduction element is achieved. Usually, the volume reduction element lies only against the radial inside or only against the radial outside of the cavity. If however the volume reduction element is divided into several portions, it is possible to cause some of the portions to lie against the radial inside and other portions to lie against the radial outside of the cavity.

Here it is preferred that the volume reduction element lies against the radial inside and/or the radial outside of the cavity under tension. In this way, the friction between the volume reduction element and the radial inside of the cavity, or between the volume reduction element and the radial outside the cavity, is made relatively large so that the volume reduction element cannot be moved by the fluid flowing by. The volume reduction element effectively becomes clamped in the cavity.

In addition or alternatively, it may be provided that the volume reduction element is connected to the radial inside and/or the radial outside of the cavity. Such a connection may for example be achieved by gluing, welding or similar. Thus the volume reduction element is held immovably in the cavity.

It is also advantageous if the auxiliary element at least intrudes into the second connector and forms a ring gap with the connecting stub of the second connector, wherein the ring gap has a cross-section area which corresponds to 0.7 to 1.3 times a cross-section area of the cavity provided with the volume reduction element. A quantity of fluid—in any case, relatively small—may remain in the connector which can easily be extracted by the pump.

The invention is described below with reference to a preferred exemplary embodiment in connection with the drawing. The drawing shows:

FIG. 1 a highly diagrammatic section view of a fluid line, and

FIG. 2 a section II-II from FIG. 1.

A fluid line 1 has a pipe 2 which has an inlet-side end portion 3 and an outlet-side end portion 4.

A first connector 5 is arranged at the inlet-side end portion 3. The first connector 5 has a stub 6 onto which the pipe 2 is pushed. The first connector 5 furthermore has a connection geometry 7 which is connected to a pump 8 (depicted diagrammatically). The pump 8, as indicated by a double arrow 9, has a reversible delivery direction, i.e. the pump 8 can deliver a fluid into the line 1 or it can extract the fluid from the line 1.

A second connector 10 is arranged at the outlet-side end portion 4. The second connector 10 also has a stub 11 onto which the pipe 2 is pushed. The second connector 10 has a connection geometry 12 which is connected to an injection device 13. The injection device 13 has a nozzle 14 (depicted diagrammatically). A plurality of nozzles may also be provided. An electrically actuatable valve 15 is connected upstream of the nozzle 14, so that a fluid can be delivered from the line 1 via the injection device 13 in a targeted fashion.

An auxiliary device 16 is arranged in the pipe 2, in the present case formed as a heating rod. The auxiliary device 16 is inserted both in the stub 6 of the first connector 5 and in the stub 11 of the second connector 10. The auxiliary device 16 leaves the first connector 5 and the second connector 10 at the side, i.e. out of the drawing plane, so that electrical energy can be introduced into the auxiliary element 16 at least in one of the connectors 5, 10, in order to generate a heating power.

A cavity 17 is arranged between the pipe 2 and the auxiliary element 16. If just a single auxiliary element 16 is arranged in the interior of the pipe 2, the cavity 17 may be described as "annular". This designation is however retained for the sake of simplicity and also applies if, instead of a single auxiliary element 16, for example two or more auxiliary elements 16 are provided, for example two heating wires running parallel.

The cavity 17 has a volume which is delimited radially outwardly by the pipe 2 and radially inwardly by the auxiliary element 16. Since the auxiliary element 16 must also pass through the stubs 6, 11 of the connectors 5, 10, and the pipe 2 is pushed onto the stubs 6, 11 and therefore has a larger inner diameter than the stubs 6, 11, the cavity 17 necessarily has a relatively large radial extension and hence also a relatively large volume. A large volume imposes considerable requirements on the suction power of the pump 8.

In order to keep these requirements low, a volume reduction element 18 is arranged in the cavity 17 and is formed from a plurality of portions 18a, 18b, 18c. A gap 19a is formed between the portions 18a and 18b. A gap 19b is arranged between the portions 18b and 18c. The gaps 19a and 19b each lie in curved portions 20, 21 of the pipe 2.

On production of the fluid line 1, the pipe 2 is first extended straight. The auxiliary element 16 is also formed with a straight extension and can thus be inserted easily into the straight pipe 2. The portions 18a-18c of the volume reduction element 18 can in this state be introduced without difficulty into the interior of the pipe 2. Normally, the connectors 5, 10 are inserted in the end portions 3, 4 of the pipe 2. Then the pipe 2 is shaped and can be thermofixed. The gaps 19a, 19b do not disrupt the formation of the curved portions 20, 21 of the pipe 2.

The volume reduction element 18 may have more than the three portions 18a, 18b, 18c shown. Outside the curved portions 20, 21 of the pipe 2, the portions may abut each other so that no significant gap results. The gaps 19a, 19b are shown excessively large here for reasons of clarity.

The portions 18a, 18c lie with their radial inside against the auxiliary element 16. As can be seen from FIG. 2, the portion 18a of the volume reduction element has a recess 22 which extends along the length of the pipe 2.

Between the portion 18a of the volume reduction element 18 and the pipe 2, a gap 23 is formed in which the volume available for the fluid has been greatly reduced. The drawing should not be interpreted as being to scale. However, there is a relatively large wetted surface area which increases the flow resistance for the fluid in the gap 23. This flow resistance may under certain circumstances lead to problems on extraction of the fluid by the pump 8. The recess 22 however provides a flow channel in which a far smaller wetted surface area is available, which therefore has a relatively low flow resistance, allowing the fluid to be extracted from the pipe 2.

The portion 18a may therefore be formed as a C-shaped clip which simply consists of a pipe portion slotted in the longitudinal direction, the inner diameter of which is smaller than the outer diameter of the auxiliary element 16. The portion 18a of the volume reduction element 18 may then be clipped onto the auxiliary element 16 before the auxiliary element 16 is pushed into the pipe 2. The portion 18a then adheres to the auxiliary element 16 with a certain tension.

Naturally, the portion 18a may also be glued or welded to the auxiliary element 16 if necessary.

The portion 18c of the volume reduction element is configured accordingly and clipped onto the auxiliary element 16. The portion 18b however lies with its radial outside against the radial inside of the pipe 2. Here too, the portion 18b may be provided with a radially outward pretension so that it lies with a certain tension against the inside of the pipe 2. Here again, advantageously a recess 22 is provided which forms a flow channel.

Normally, all portions 18a-18c are either fixed to the auxiliary element 16 or lie against the inside of the pipe 2. The depiction in FIG. 1 was selected to show that there are various ways of positioning the portions 18a-18c in the cavity 17.

The depiction in the drawing is not to scale.

It is clear that the auxiliary element 16 enters the second connector 10 and forms a ring gap 24 with the connecting stub 11. This ring 24 has a cross-section area which corresponds to 70% to 130% of the cross-section area of the gap 23. In other words, the cross-section area of the ring gap 24 is approximately the same size as the cross-section area of the gap 23.

The invention claimed is:

1. A fluid line comprising:
a pipe which has an inlet-side end portion with a first connector and an outlet-side end portion with a second connector;
at least one auxiliary element arranged in the pipe to form a radial inside wall of a radially delimited cavity, the pipe forming a radial outside wall of the cavity; and a volume reduction element being arranged in the cavity, at least in the region of the outlet-side end portion, wherein the volume reduction element has a recess extending along a length of the pipe to form a continuous flow channel, wherein the at least one auxiliary element comprises a heating rod, wherein the first connector has a first stub onto which the pipe is pushed and a connection geometry which is connectable to a pump, wherein the second connector has a second stub onto which the pipe is pushed and a connection geometry which is connectable to an injection device, and wherein the volume reduction element comprises at least a first axial portion that lies against the radial inside wall of the cavity and another axial portion that lies against the radial outside wall of the cavity.

2. The fluid line as claimed in claim 1, wherein the volume reduction element extends beyond the outlet-side end portion in a direction of the inlet-side end portion.

3. The fluid line as claimed in claim 2, wherein a gap is provided between axial portion of the volume reduction element and the another portion of the volume reduction element.

4. The fluid line as claimed in claim 3, wherein the pipe has a curved portion and the gap is arranged in the curved portion.

5. The fluid line as claimed in claim 1, wherein the volume reduction element extends over an entire length of the pipe.

6. The fluid line as claimed in claim 1, wherein the axial portion of the volume reduction element lies against the radial inside wall of the cavity under tension and the another axial portion of the volume reduction element lies against the radial outside wall of the cavity under tension.

7. The fluid line as claimed in claim 1, wherein the axial portion of the volume reduction element is connected to the radial inside wall of the cavity and the another axial portion of the volume reduction element is connected to the radial outside wall of the cavity.

8. The fluid line as claimed in claim 1, wherein the at least one auxiliary element at least intrudes into the second connector to form a ring gap with the connecting stub of the second connector, and wherein the ring gap has a cross-section area which corresponds to 0.7 to 1.3 times a cross-section area of the cavity formed by the volume reduction element.

9. A method to avoid a risk of damage to a injection device by freezing urea, the method comprising:

arranging the fluid pipe according to claim 1 to transport a urea solution from a storage container to an injection device, injecting the urea solution into the exhaust tract of the diesel engine to reduce nitrous oxides; and after switching off the diesel engine, drawing back the urea solution from the fluid line so that at least the injection device is free from urea solution, wherein a pump, which is configured for drawing back the urea solution and for delivering urea solution from the storage container to the injection device with a specific pressure, has greater power for delivering the urea solution than for suctioning the urea solution.

* * * * *